(12) United States Patent
Ling et al.

(10) Patent No.: US 8,129,031 B2
(45) Date of Patent: Mar. 6, 2012

(54) FILMS CONTAINING MICROLAYER STRUCTURES

(75) Inventors: Michael Tung-Kiung Ling, Vernon Hills, IL (US); Moh-Ching Oliver Chang, Lake in the Hills, IL (US); Thomas John Myers, Wauwatosa, WI (US); Ying-Cheng Lo, Green Oaks, IL (US)

(73) Assignees: Baxter International Inc., Deerfield, IL (US); Baxter Healthcare S.A., Glattpark (Opfikon) (CH)

( * ) Notice: Subject to any disclaimer, the term of this patent is extended or adjusted under 35 U.S.C. 154(b) by 645 days.

(21) Appl. No.: 12/244,594

(22) Filed: Oct. 2, 2008

(65) Prior Publication Data

US 2009/0087654 A1   Apr. 2, 2009

Related U.S. Application Data

(60) Provisional application No. 60/977,032, filed on Oct. 2, 2007.

(51) Int. Cl.
*B32B 27/00* (2006.01)
*B32B 27/08* (2006.01)

(52) U.S. Cl. .................................... 428/515; 428/475.8

(58) Field of Classification Search ....................... None
See application file for complete search history.

(56) References Cited

U.S. PATENT DOCUMENTS

| | | | |
|---|---|---|---|
| 3,579,416 A | 5/1971 | Schrenk et al. | |
| 3,759,647 A | 9/1973 | Schrenk et al. | |
| 4,661,303 A | 4/1987 | Chum et al. | |
| 4,873,037 A | 10/1989 | Chau et al. | |
| 5,451,449 A | 9/1995 | Shetty et al. | |
| 6,071,450 A | 6/2000 | Topolkaraev et al. | |
| 6,082,025 A | 7/2000 | Bonk et al. | |
| 6,127,026 A | 10/2000 | Bonk et al. | |
| 6,261,674 B1 | 7/2001 | Branham et al. | |
| 6,582,786 B1 * | 6/2003 | Bonk et al. | 428/35.7 |
| 6,586,354 B1 | 7/2003 | Topolkaraev et al. | |
| 6,680,114 B2 | 1/2004 | Kody et al. | |
| 7,179,952 B2 | 2/2007 | Vukos et al. | |
| 7,303,642 B2 | 12/2007 | Topolkaraev | |
| 2004/0089412 A1 | 5/2004 | Topolkaraev | |
| 2004/0213928 A1 | 10/2004 | Sebastian et al. | |
| 2004/0219364 A1 | 11/2004 | Shirk et al. | |
| 2005/0049566 A1 | 3/2005 | Vukos et al. | |
| 2005/0090616 A1 | 4/2005 | Dias et al. | |
| 2008/0038533 A1 | 2/2008 | Best et al. | |

FOREIGN PATENT DOCUMENTS

| | | |
|---|---|---|
| EP | 0 355 982 | 2/1990 |
| WO | 9933651 | 7/1999 |
| WO | 9933654 | 7/1999 |
| WO | 00 76765 | 12/2000 |
| WO | 2006047374 | 5/2006 |

OTHER PUBLICATIONS

Schuman et al., "Solid state structure and melting behavior of interdiffused polyethylenes in microlayers," Polymer, Elsevier Science Publishers B.V. GB, vol. 40, No. 26, Dec. 1, 1999, pp. 7373-7385, XP004362747.
Im et al., "Coextruded Microlayer Film and Sheet," Journal of Plastic Film & Sheeting, vol. 4, Apr. 1, 1988, pp. 104-115, XP000889966.
Poon et al., "Adhesion of polyethylene blends to polypropylene," Polymer, Elsevier Science Publishers B.V., GB, vol. 45, No. 3, Feb. 1, 2004, pp. 893-903, XP004483675.
International Search Report dated Feb. 17, 2009, 7 pgs.
Written Opinion of the International Searching Authority dated Feb. 17, 2009, 5 pgs.
Bernal-Lara et al., "Structure and thermal stability of polyethylene nanolayers," Polymer, Elsevier Science Publishers B.V. GB, vol. 46, No. 9, Apr. 15, 2005, pp. 3043-3055.
International Search Report dated Mar. 26, 2009 (7 pgs.).
Written Opinion of the International Searching Authority dated Mar. 26, 2009 (8 pgs.).

* cited by examiner

*Primary Examiner* — Sheeba Ahmed
(74) *Attorney, Agent, or Firm* — K&L Gates LLP

(57) ABSTRACT

Films containing microlayer structures are provided. In a general embodiment, the present disclosure provides an autoclavable film containing a first microlayer of a heat resistant polymer and a second microlayer of a flexible polymer attached to the first microlayer. Each of the first microlayer and the second microlayer has a thickness ranging between about 0.01 microns and about 10 microns.

4 Claims, 6 Drawing Sheets

FIG. 3A

| SAMPLE | 61-1 | 61-2 | 61-3 | 61-4 | 61-5 | 61-6 | 61-7 | 61-8 | 61-9 |
|---|---|---|---|---|---|---|---|---|---|
| Layer B (mils) | 0.325 | 0.367 | 0.292 | 0.308 | 0.317 | 0.308 | 0.167 | 0.133 | 0.150 |
| Impact, RT (Autoclaved) | | | | | | | | | |
| Maximum load, kN | 0.11 | 0.11 | 0.07 | 0.08 | 0.10 | 0.10 | 0.10 | 0.08 | 0.09 |
| Energy to F, J | 1.9 | 1.3 | 2.1 | 1.4 | 2.1 | 1.3 | 1.2 | 1.5 | 1.4 |
| Norm. energy at Max, J/mm | 9.1 | 4.3 | 8.2 | 5.4 | 9.6 | 4.6 | 6.0 | 7.5 | 6.2 |
| Norm. energy at F, J/mm | 9.4 | 4.6 | 8.4 | 5.6 | 9.8 | 4.8 | 6.2 | 7.7 | 6.3 |
| Deflection at max load, mm | 30.2 | 21.9 | 47.6 | 28.3 | 36.8 | 23.7 | 21.0 | 28.9 | 24.6 |
| Deflection at F, mm | 31.0 | 22.8 | 48.5 | 29.1 | 37.4 | 24.4 | 21.4 | 29.6 | 25.1 |
| Morphology | 5/5 Ductile | 5/5 Ductile | 5/5 Ductile | 5/5 Ductile | 5/5 Ductile | 5/5 Ductile | 5/5 Ductile | 5/5 Ductile | 5/5 Ductile |
| Impact, RT (NonAutoclaved) | | | | | | | | | |
| Maximum load, kN | 0.13 | 0.12 | 0.07 | 0.08 | 0.12 | 0.10 | 0.10 | 0.08 | 0.09 |
| Energy to F, J | 4.8 | 2.7 | 2.3 | 2.4 | 5.1 | 2.2 | 1.5 | 1.9 | 1.9 |
| Norm. engergy at Max, J/mm | 19.8 | 13.3 | 11.2 | 8.7 | 18.2 | 8.5 | 7.4 | 9.7 | 10.4 |
| Norm. engergy at F, J/mm | 23.8 | 13.9 | 11.6 | 8.9 | 24.2 | 8.6 | 7.6 | 9.9 | 10.6 |
| Deflection at max load, mm | 47.6 | 37.2 | 56.3 | 43.6 | 56.3 | 34.7 | 26.7 | 37.3 | 34.5 |
| Deflection at F, mm | 57.6 | 37.9 | 58.5 | 44.5 | 78.7 | 35.2 | 27.2 | 37.8 | 35.0 |
| Morphology | 5/5 Ductile | 5/5 Ductile | 5/5 Ductile | 4/5 Ductile, 1/5 Brittle | 5/5 No Puncture | 5/5 Ductile | 5/5 Ductile | 5/5 Ductile | 5/5 Ductile |
| Haze (Autoclaved) | | | | | | | | | |
| Haze (dry), % | 37.6 | 41.3 | 36.6 | 22.6 | 51.9 | 52.7 | 16.5 | 14.0 | 11.7 |
| Haze (wet on seal-side), % | 28.5 | 29.6 | 28.1 | 21.7 | 34.3 | 42.7 | 11.5 | 13.2 | 7.5 |
| Haze (wet on both sides), % | 12.9 | 20.0 | 13.5 | 7.8 | 12.7 | 11.5 | 6.7 | 6.5 | 4.2 |
| Haze (NonAutoclaved) | | | | | | | | | |
| Haze (dry), % | 12.7 | 15.2 | 15.6 | 16.7 | 8.5 | 10.4 | 13.1 | 14.0 | 10.7 |
| Haze (wet on seal-side), % | 5.6 | 9.4 | 10.0 | 10.0 | 3.7 | 9.0 | 7.9 | 11.1 | 7.4 |
| Haze (wet on both sides), % | 2.8 | 4.1 | 5.7 | 5.2 | 2.1 | 4.2 | 4.2 | 7.1 | 4.2 |

FIG. 3B

| SAMPLE | 61-1 | 61-2 | 61-3 | 61-4 | 61-5 | 61-6 | 61-7 | 61-8 | 61-9 |
|---|---|---|---|---|---|---|---|---|---|
| Layer B (mils) | 0.325 | 0.367 | 0.292 | 0.308 | 0.317 | 0.308 | 0.167 | 0.133 | 0.150 |
| Tensile, TD (Autoclaved) | | | | | | | | | |
| Young's modulus, kpsi | 27.5 | 42.2 | 14.4 | 33.4 | 12.7 | 33.6 | 41.6 | 30.4 | 36.3 |
| Modulus (2% secant), kpsi | 24.2 | 35.7 | 15.4 | 29.4 | 12.6 | 27.9 | 34.7 | 25.6 | 31.1 |
| Yield strength, psi | 1277.0 | 1505.0 | 604.0 | 1085.0 | 848.0 | 1265.0 | 1764.0 | 1252.0 | 1546.0 |
| Yield elongation, % | 20.9 | 18.0 | 17.8 | 15.0 | 27.2 | 19.9 | 19.6 | 21.9 | 20.7 |
| Tensile strength, psi | 2839.0 | 5315.0 | 1155.0 | 1742.0 | 3255.0 | 4636.0 | 6009.0 | 2132.0 | 5547.0 |
| Tensile elongation, % | 443.0 | 570.0 | 459.0 | 434.0 | 566.0 | 614.0 | 730.0 | 563.0 | 601.0 |
| Tensile, MD (Autoclaved) | | | | | | | | | |
| Young's modulus, kpsi | 29.6 | 32.5 | 17.4 | 30.1 | 22.2 | 34.1 | 39.5 | 34.2 | 35.1 |
| Modulus (2% secant), kpsi | 26.5 | 27.1 | 16.1 | 24.2 | 19.5 | 28.9 | 33.8 | 28.9 | 31.1 |
| Yield strength, psi | 1529.0 | 1466.0 | 698.0 | 1056.0 | 1051.0 | 1379.0 | 1935.0 | 1422.0 | 1535.0 |
| Yield elongation, % | 22.5 | 27.8 | 20.3 | 17.1 | 26.5 | 18.8 | 24.4 | 20.3 | 24.8 |
| Tensile strength, psi | 3552.0 | 4124.0 | 1450.0 | 2006.0 | 4414.0 | 4763.0 | 5932.0 | 2535.0 | 5371.0 |
| Tensile elongation, % | 452.0 | 608.0 | 574.0 | 518.0 | 622.0 | 691.0 | 693.0 | 505.0 | 629.0 |
| Tensile, TD (NonAutoclaved) | | | | | | | | | |
| Young's modulus, kpsi | 22.4 | 31.3 | 13.2 | 30.7 | 17.0 | 28.4 | 36.0 | 31.2 | 30.8 |
| Modulus (2% secant), kpsi | 21.9 | 30.2 | 13.7 | 28.3 | 14.7 | 26.2 | 32.5 | 28.5 | 30.6 |
| Yield strength, psi | 1079.0 | 1304.0 | 457.0 | 835.0 | 785.0 | 1055.0 | 1490.0 | 1133.0 | 1246.0 |
| Yield elongation, % | 17.0 | 16.5 | 18.0 | 18.4 | 17.9 | 17.9 | 18.2 | 13.9 | 14.7 |
| Tensile strength, psi | 5252.0 | 5263.0 | 1503.0 | 2665.0 | 4713.0 | 5116.0 | 5553.0 | 1695.0 | 3224.0 |
| Tensile elongation, % | 581.0 | 571.0 | 670.0 | 675.0 | 612.0 | 610.0 | 617.0 | 502.0 | 503.0 |
| Tensile, MD (NonAutoclaved) | | | | | | | | | |
| Young's modulus, kpsi | 24.0 | 33.2 | 16.4 | 31.8 | 17.6 | 27.7 | 38.6 | 33.2 | 34.5 |
| Modulus (2% secant), kpsi | 17.6 | 35.3 | 17.8 | 28.7 | 17.3 | 26.5 | 33.1 | 30.7 | 32.8 |
| Yield strength, psi | 1053.0 | 1532.0 | 617.0 | 977.0 | 866.0 | 1136.0 | 1551.0 | 1167.0 | 1335.0 |
| Yield elongation, % | 17.0 | 16.2 | 21.8 | 15.8 | 22.4 | 15.3 | 17.9 | 14.7 | 17.6 |
| Tensile strength, psi | 5956.0 | 6560.0 | 3649.0 | 2755.0 | 4366.0 | 4644.0 | 6587.0 | 2079.0 | 3597.0 |
| Tensile elongation, % | 568.0 | 568.0 | 788.0 | 530.0 | 498.0 | 569.0 | 563.0 | 505.0 | 521.0 | ize
FILMS CONTAINING MICROLAYER STRUCTURES

CROSS REFERENCE TO RELATED APPLICATIONS

This application claims the benefit of U.S. Provisional Patent Application Ser. No. 60/977,032 filed on Oct. 2, 2007, the entire disclosure of which is hereby incorporated by reference.

BACKGROUND

The present disclosure relates generally to polymer films. More specifically, the present disclosure relates to autoclavable polymer films containing microlayer structures.

Coextruded films are widely used throughout a variety of industries, which include containers for food or medical solution packaging. These coextruded films should provide toughness or ability to resist damage in use or transport. The films can also have the ability to make both a peel seal at the desired strength to suit the application as well as a permanent seal to permanently enclose a container. In addition, for medical applications requiring autoclave sterilization, the film should be able to withstand autoclaving at 121° C. while maintaining the film dimension and strength.

SUMMARY

The present disclosure relates to polymer films containing microlayer structures. In a general embodiment, the present disclosure provides an autoclavable film containing a first microlayer of a heat resistant polymer and a second microlayer of a flexible polymer having a melting temperature ranging between about 50° C. and about 120° C. attached to the first microlayer. Each of the first microlayer and the second microlayer has a thickness ranging between about 0.01 microns and about 10 microns.

In an embodiment, the flexible polymer has a melting temperature ranging between about 70° C. and about 120° C. In another embodiment, the flexible polymer has a melting temperature ranging between about 100° C. and about 120° C.

In an embodiment, the autoclavable film comprises a contiguous structure of at least ten alternating layers of the first microlayer and the second microlayer. In another embodiment, the autoclavable film comprises a contiguous structure of about ten to about two thousand alternating layers of the first microlayer and the second microlayer. In an alternative embodiment, the autoclavable film comprises a contiguous structure of about ten to about two thousand layers of at least one first microlayer and at least one second microlayer in any amount and any order.

In an embodiment, the heat resistant polymer is one or more of polypropylene homopolymers, random copolymer polypropylenes, cyclic olefin copolymers, or a combination thereof. In an embodiment, the flexible polymer is one or more of elastomeric polypropylenes, low density polyethylenes, ultra low density polyethylenes, or a combination thereof. The flexible polymer can also be substantially linear polyethylenes in the form of ethylene-alpha olefin plastomers, olefin block copolymers, or a combination thereof. In addition, the flexible polymer can be an ethylene copolymer. In alternative embodiment, the first microlayer and the second microlayer exclude polyvinyl chloride (PVC).

In another embodiment, the present disclosure provides an autoclavable film containing a skin layer, a core layer, and a seal layer. The core layer comprises a first microlayer of a heat resistant polymer and a second microlayer of a flexible polymer having a melting temperature ranging between about 50° C. and about 120° C. attached to the first microlayer, each of the first microlayer and the second microlayer having thickness ranging between about 0.01 microns and about 10 microns. The skin layer and the seal layer can comprise material such as a random copolymer polypropylenes, polypropylene homopolymers, nylons, styrene-ethylene-butylene-styrene block copolymers, copolyester ethers, or a combination thereof. In an embodiment, the skin layer and/or the seal layer is in the form of one or more microlayers each having a thickness ranging between about 0.01 microns and about 10 microns.

In another embodiment, the present disclosure provides a film containing a first skin layer, a core layer, and a second skin layer. The first skin layer and/or the second skin layer can also be in the form of one or more microlayers each having a thickness ranging between about 0.01 microns and about 10 microns.

In an alternative embodiment, the present disclosure provides a method of making an autoclavable film. The method comprises coextruding a first microlayer of a heat resistant polymer and a second microlayer of a flexible polymer having a melting temperature ranging between about 50° C. and about 120° C. attached to the first microlayer. Each of the first microlayer and the second microlayer has thickness ranging between about 0.01 microns and about 10 microns.

An advantage of the present disclosure is to provide improved non-barrier films that are autoclavable without wrinkling.

Another advantage of the present disclosure is to provide improved non-PVC films.

Yet another advantage of the present disclosure is to provide improved core layers for polymer films.

Still another advantage of the present disclosure is to provide improved methods of making non-PVC films.

Additional features and advantages are described herein, and will be apparent from the following Detailed Description and the figures.

BRIEF DESCRIPTION OF THE FIGURES

FIGS. 3A and 3B illustrate physical characteristics of the microlayer films of Tables 1 and 2.

DETAILED DESCRIPTION

The present disclosure relates to polymer films containing microlayer structures. The microlayer structures comprise combinations of ultra-thin polymer layers and can be designed to provide improved characteristics to the polymer films. The microlayer structures can be used as optical films that selectively filter or reflect particular wavelengths of light. The autoclavable films can also have a toughness or ability to resist damage in use or transport.

Applicants have surprisingly found that flexible polymer materials having a melting temperature below that of autoclaving (e.g. 121° C.) can successfully be used to produce autoclavable films when used as part of a microlayer structure. For example, for medical applications involving the autoclave process, the films withstand autoclaving at 121° C. while maintaining the film dimension, strength and geometry without cosmetic wrinkling.

Figure 1:
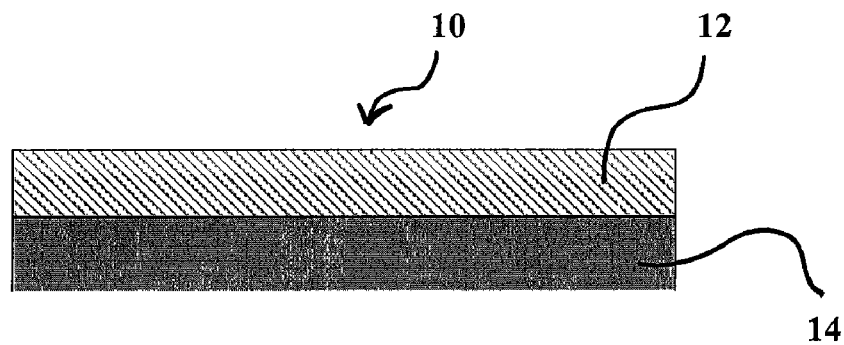
FIG. 1 is a cross-sectional view of a microlayer structure in an embodiment of the present disclosure.
Figure 2:
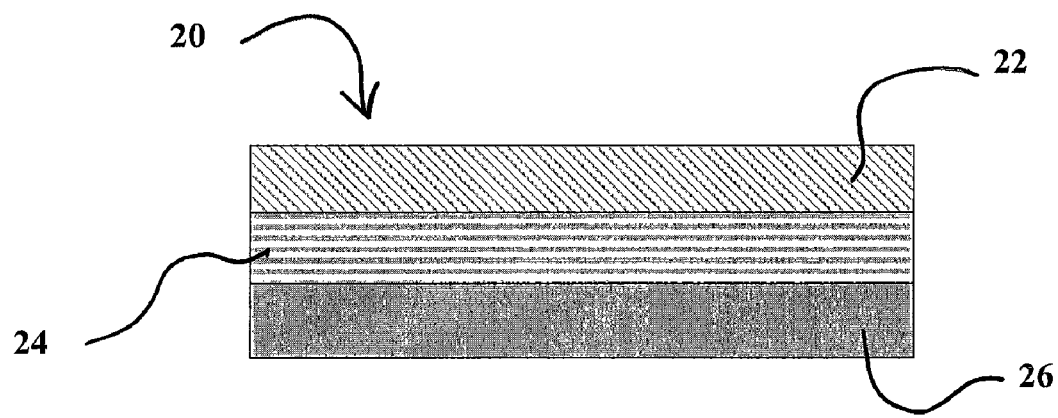
FIG. 2 is a cross-sectional view of a film containing a microlayer structure in an embodiment of the present disclosure.

In a general embodiment illustrated in FIG. 1, the present disclosure provides an autoclavable film 10 containing a first microlayer 12 of a heat resistant polymer and a second microlayer 14 of a flexible polymer having a melting temperature ranging between about 50° C. and about 120° C. attached to the first microlayer 12. The first microlayer 12 and the second microlayer 14 each has a thickness ranging between about 0.01 microns and about 10 microns.

In alternative embodiments, the flexible polymer can have a melting temperature lower than that of standard autoclave temperatures including, for example, less than about 120° C., 115° C., 110° C., 105° C., 100° C., 95° C., 90° C., 85° C., 80° C., 75° C., 70° C., 65° C., 60° C., and the like. In an embodiment, the flexible polymer has a melting temperature ranging between about 70° C. and about 120° C. In an embodiment, the flexible polymer has a melting temperature ranging between about 100° C. and about 120° C.

In an embodiment, the autoclavable film comprises a contiguous structure of at least ten alternating layers of the first microlayer and the second microlayer. The film can further comprise a contiguous structure of about ten to about two thousand alternating layers of the first microlayer and the second microlayer. In an embodiment, the autoclavable film can comprise a contiguous structure of about ten to about two thousand layers of at least one of the first microlayers and at least one of the second microlayers in any suitable number and order. In an embodiment, the first microlayer and/or the second microlayer exclude any PVCs.

The heat resistant polymer can be, for example, polypropylene homopolymers, polypropylene random copolymers, cyclic olefin copolymers, or a combination thereof.

The flexible polymer can be, for example, elastomeric polypropylenes, low density polyethylenes (e.g. substantially linear polyethylenes having a density less than about 0.90), ultra low density polyethylenes, or a combinations thereof. The flexible polymer can also be substantially linear polyethylenes in the form of ethylene-alpha olefin plastomers, olefin block copolymers, or a combination thereof. Alternatively, the flexible polymer can be an ethylene copolymer with an unsaturated carboxylic acid or carboxylic acid ester such as vinyl acetate (EVA), methyl acrylate (EMA), or acrylic acid (EAA). Suitable ethylene polymers have a melting point temperature of greater than about 50° C.

Suitable random copolymer polypropylenes include those sold by Flint Hills Resources under the HUNTSMAN tradename and Borealis under the BOREALIS and TOTAL tradenames. Suitable polypropylene homopolymers include those sold by Flint Hills Resources under the HUNTSMAN trade name. Suitable low density polyethylenes and ultra low density polyethylenes include those sold by Dow Chemical Company under the AFFINITY and ENGAGE tradenames. Suitable olefin block copolymers include those sold by Dow Chemical Company under the INFUSE trade names.

The microlayer films can further comprise one or more additional layers in addition to the first and second microlayers. In an alternative embodiment, the present disclosure provides an autoclavable film 20 containing a skin layer 22, a core layer 24 attached to the skin layer 22, and a seal layer 26 attached to the core layer 24. The core layer 24 comprises a first microlayer of a heat resistant polymer and a second microlayer of a flexible polymer having a melting temperature ranging between about 50° C. and about 120° C. attached to the first microlayer. The first microlayer and the second microlayer each have a thickness ranging between about 0.01 microns and about 10 microns.

The skin layer and/or the seal layer can also be in the form of one or more microlayers each having a thickness ranging between about 0.01 microns and about 10 microns. In another embodiment, the skin layer and/or the seal layer has a thickness greater than about 10 microns. In addition, the seal layer can have the required characteristics to be used as a peel seal layer or a permanent seal layer, for example, as part of a multi-chambered container.

In an alternative embodiment, the present disclosure provides a film containing a first skin layer, a core layer attached to the first skin layer, and a second skin layer attached to the core layer. The core layer comprises the microstructure layer as described in previously mentioned embodiments. The first skin layer and/or the second skin layer can also be in the form of one or more microlayers each having a thickness ranging between about 0.01 microns and about 10 microns. In an embodiment, the first skin layer and/or the second skin layer has a thickness greater than about 10 microns.

The skin layers can comprise a suitable skin material such as one or more random copolymer polypropylenes, polypropylene homopolymers, nylons, styrene-ethylene-butylene-styrene block copolymers, copolyester ethers, or a combination thereof. The seal layers can comprise a suitable sealable material such as one or more random copolymer polypropylenes, polypropylene homopolymers, nylons, styrene-ethylene-butylene-styrene block copolymers, copolyester ethers, or a combination thereof. The films can further include one or more tie layers that attach at least one of the skin layer and the seal layer to the core layer containing the microlayers.

Suitable random copolymer polypropylenes include those sold by Flint Hills Resources under the HUNTSMAN tradename and Borealis under the BOREALIS and TOTAL tradenames. Suitable polypropylene homopolymers include those sold by Flint Hills Resources under the HUNTSMAN trade name. Suitable styrene-ethylene-butylene-styrene block copolymers include those sold by Kraton Polymers under the KRATON tradename. Suitable nylons include those sold by EMS under the GRIVORY and GRILON trade names.

As previously discussed, an approach to improving the toughness and heat resistance of the co-extruded films is to include a microlayer structure as the core layer or intermediate layer of a film having one or more skin and/or seal layers. In alternative embodiments, the core layer can comprise the following:

Alternating microlayers of polypropylene (PP) microlayers and ultra low density polyethylene (ULDPE) microlayers. PP microlayers give the film improved autoclavability due to its melting point higher than 121° C. The ULDPE microlayers may include an ethylene-alpha olefin based plastomer, olefin block copolymers (OBC's, e.g., INFUSE® [supplier: Dow]), etc., providing high flexibility and toughness.

Alternating microlayers of PP microlayers and PP elastomer microlayers. The PP elastomer such as ExxonMobil VISTAMAXX® or Dow VERSIFY® is an isotactic polypropylene with smaller and fewer crystallites for elastomeric performance, which contributes to film flexibility and toughness.

Alternating microlayers of cyclic olefin copolymer (COC) microlayers and ULDPE microlayers. COC microlayers such as TOPAS® 6013F-04 (supplier: Topas Advanced Polymers) provide superb clarity, and autoclavability.

Alternating microlayers of COC microlayers (e.g. TOPAS® 6013F-04)) and PP elastomer microlayers.

The thickness of each of the microlayers can range from about 0.01 to about 10 microns. The microlayers are capable of providing autoclavability at 121° C. without wrinkling, superb clarity, and high toughness.

In an alternative embodiment, the present disclosure provides a method of making an autoclavable film. The method comprises coextruding a first microlayer of a heat resistant polymer and a second microlayer of a flexible polymer attached to the first microlayer. The flexible polymer can have a melting temperature ranging between about 50° C. and about 120° C. Each of the first microlayer and the second microlayer having thickness ranging between about 0.01 microns and about 10 microns. The first and second microlayers can be extruded using any suitable process such as microextrusion techniques. The microlayer structures can also be coextruded with additional layers such as skin or seal layers using any suitable process.

EXAMPLES

By way of example and not limitation, the following examples are illustrative of various embodiments of the present disclosure. The percentages described herein are weight percentages unless specified otherwise.

Example 1

The experimental films shown in Tables 1 and 2 have a microlayer thickness of 0.5 to 10 microns.

TABLE 1

Microlayer films with A/B structure

A/B thickness - 5.6 microns
(2 × 16 = 32 layers)
Total thickness = 177.8 microns

| Sample | Microlayer A (% of A/B) | Microlayer B (% of A/B) |
|---|---|---|
| 61-1 | Huntsman 43M5A (20%) | Affinity PL1880-G (80%) |
| 61-2 | Huntsman 43M5A (30%) | Affinity PL1880-G (70%) |
| 61-3 | Huntsman 43M5A (20%) | Infuse 9007 (80%) |
| 61-4 | Huntsman 43M5A (30%) | Infuse 9007 (70%) |
| 61-5 | Huntsman 43M5A (20%) | Engage 8003 (80%) |
| 61-6 | Huntsman 43M5A (30%) | Engage 8003 (70%) |

TABLE 2

Microlayer structures (A/B) as a core layer for multilayer films

A/B thickness - 3.2 microns
(2 × 16 = 32 layers)
Core layer total thickness = 101.6 microns

| Sample | 38.1 microns Skin | Microlayer A (% of A/B) | Microlayer B (% of A/B) | 38.1 microns Skin |
|---|---|---|---|---|
| 61-7 | 8020 | Huntsman 43M5A (20%) | Affinity PL1880-G (80%) | 8020 |
| 61-8 | 8020 | Huntsman 43M5A (20%) | Infuse 9007 (80%) | 8020 |
| 61-9 | 8020 | Huntsman 43M5A (20%) | Engage 8003 (80%) | 8020 |

From Tables 1 and 2, the A/B thickness represents the combined thickness of a single microlayer A and microlayer B added together. The percentages shown in the parentheses represent the individual weight percentage of either microlayer A or microlayer B, which also corresponds to the percent thickness of microlayer A and microlayer B with respect to the combined thickness A/B. Regarding Table 2, one of the skin layers can be replaced with a seal layer to give the film a sealability under heat, radio frequency, ultrasonic, etc.

Key properties of those polymers used in Tables 1 and 2 are listed in Table 3. FIGS. 3A and 3B list the physical properties of the microlayer films of Tables 1 and 2.

TABLE 3

Key features of polymers used in the film structures listed in Tables 1 and 2

| Material | Chemistry | Specific gravity | Melting point (Tm) ° C. | Melt flow index (MFI), g/10 min (190° C., 2.16 kg) | MFI, g/10 min (230° C., 2.16 kg) |
|---|---|---|---|---|---|
| 8020 | 80% Huntsman 43M5A/ 20% Kraton MD6932 | — | 148 | — | — |
| Huntsman 43M5A | PP-PE random copolymer | 0.9 | 148 | — | 4.5 |
| Affinity PL1880G | ULDPE | 0.904 | 98 | 1 | — |
| Infuse 9007 | Olefin block copolymer | 0.866 | 119 | 0.5 | — |
| Engage 8003 | ULDPE | 0.885 | 78 | 1 | — |

Figure 4:
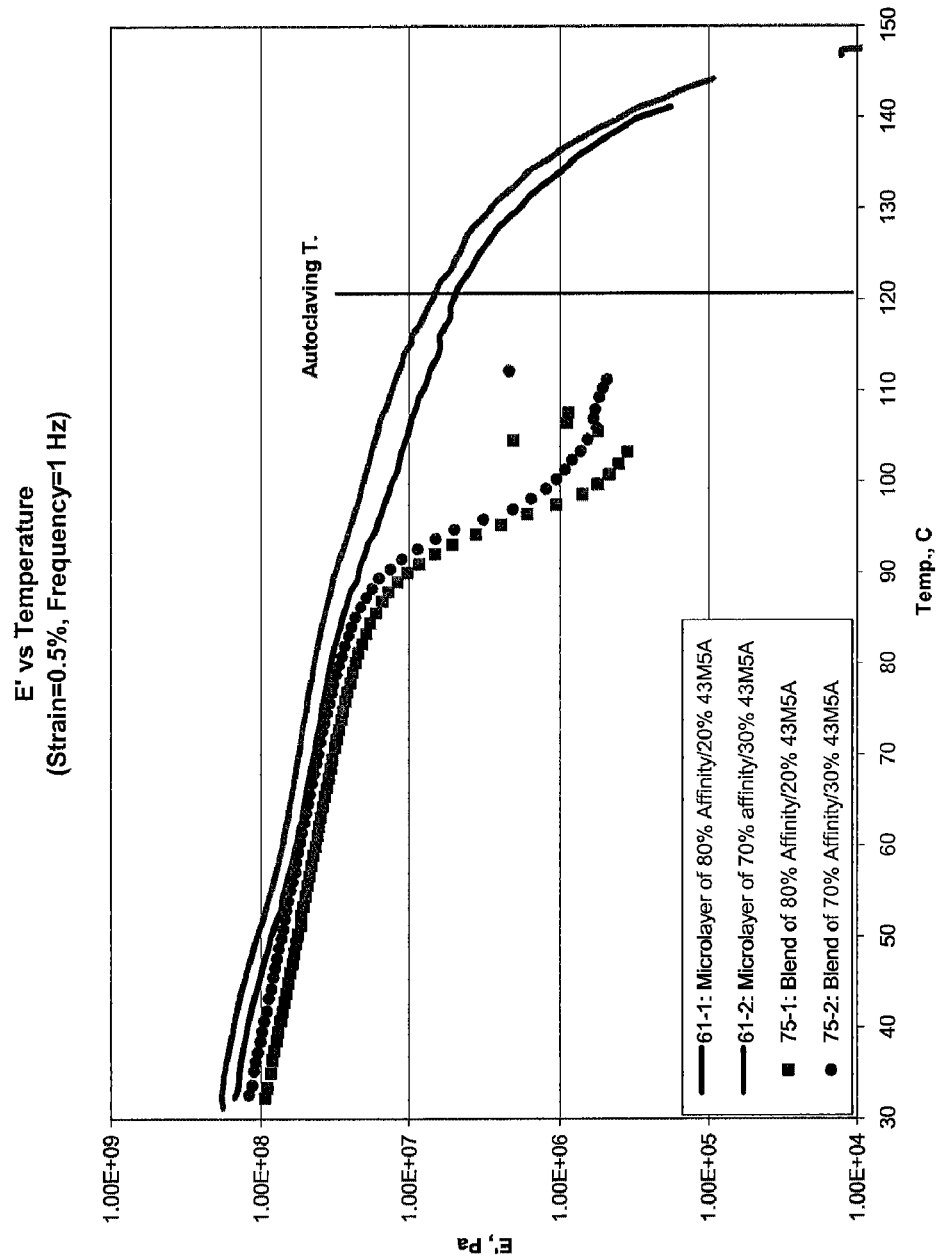
FIG. 4 is a graph showing a comparison (Young's modulus (E') versus temperature) of two films containing alternating microlayer structures in embodiments of the present disclosure versus two films containing blends of the same materials as the corresponding microlayer structures.
Figure 5:
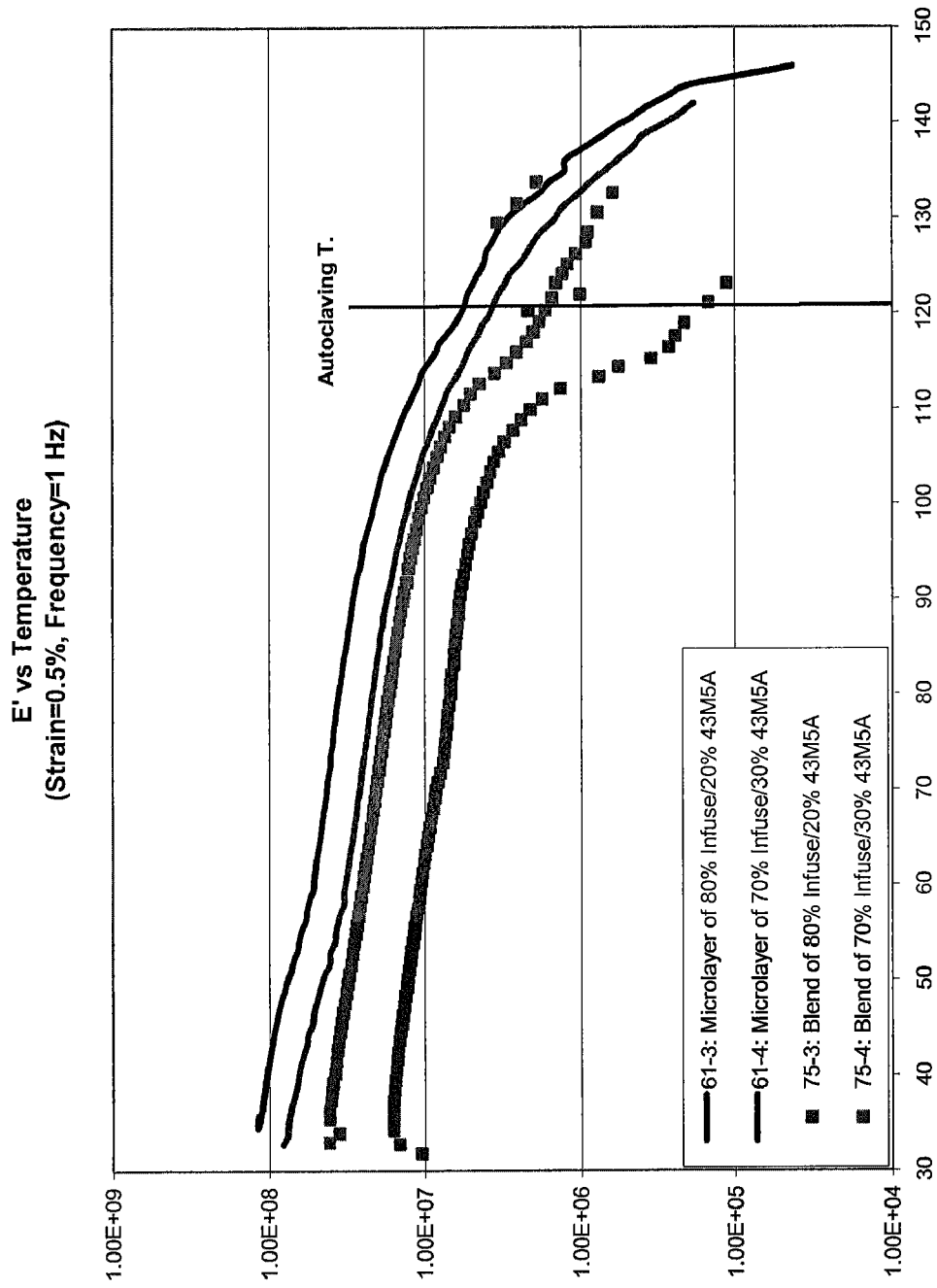
FIG. 5 is a graph showing a comparison (Young's modulus (E') versus temperature) of two films containing alternating microlayer structures in embodiments of the present disclosure versus two films containing blends of the same materials as the corresponding microlayer structures.
Figure 6:
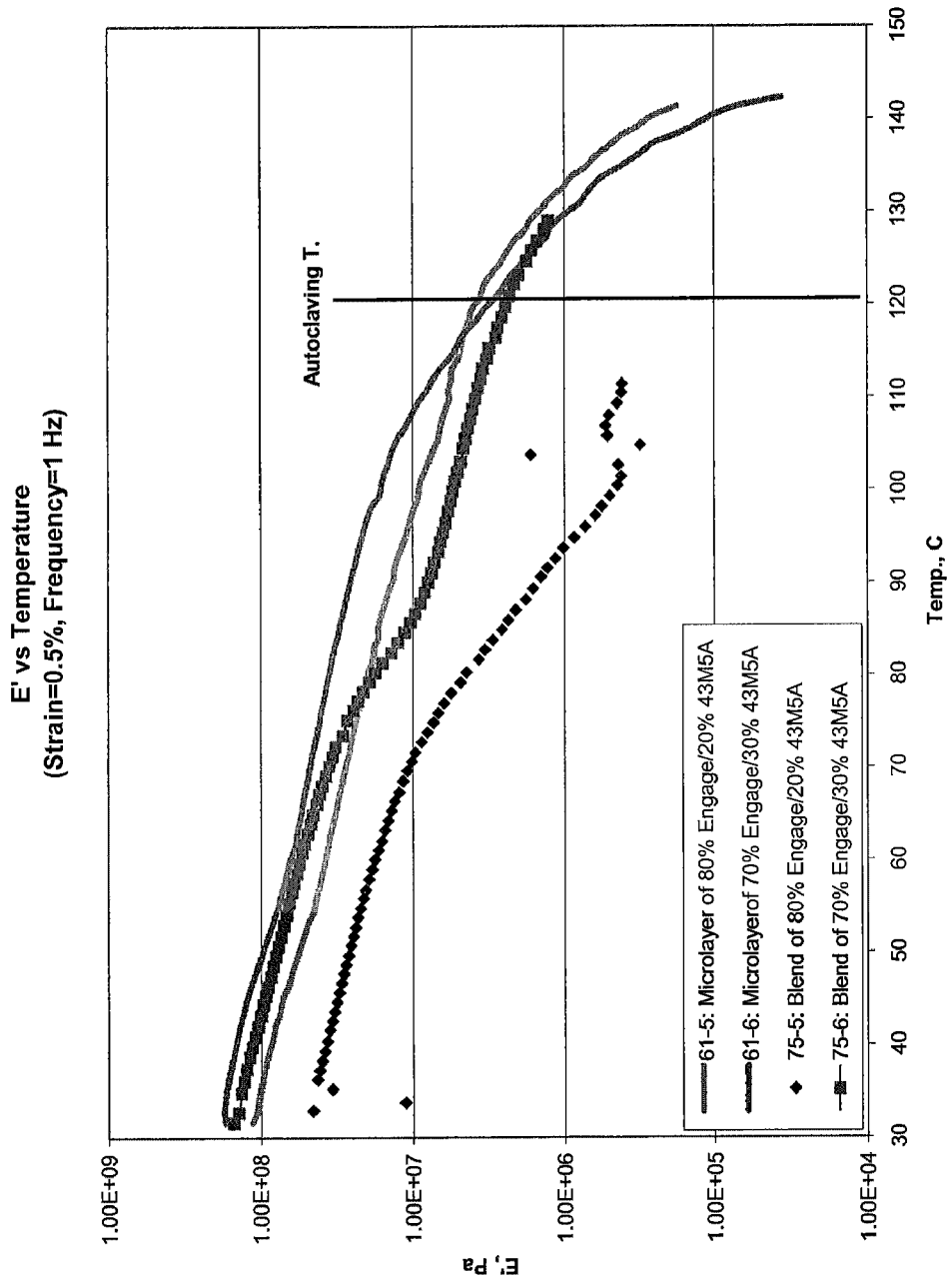
FIG. 6 is a graph showing a comparison (Young's modulus (E') versus temperature) of two films containing alternating microlayer structures in embodiments of the present disclosure versus two films containing blends of the same materials as the corresponding microlayer structures.

FIGS. 4-6 are graphs showing a comparison of Young's modulus (E') versus temperature of two films containing alternating microlayer structures in embodiments of the present disclosure versus two films containing blends of the same materials as the corresponding microlayer structures. The films are made of alternating microlayers of a heat resistant polymer and a flexible polymer. The comparative films made using the polymer blends comprise the same ratios of the heat resistant polymer and the flexible polymer as the microlayer structures except that they do not have a microlayer structure.

As seen in FIGS. 4-6, the films containing the microlayer structures have improved heat resistance or autoclavability at 121° C. As temperature increases, the films containing the microlayer structures are better able to hold their dimension and strength at autoclaving temperatures or higher compared to those films containing the corresponding polymer blends not in the form of microlayer structures.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An autoclavable film comprising:
a first microlayer of a heat resistant polymer selected from the group consisting of polypropylene homopolymers, polypropylene random copolymers, cyclic olefin copolymers, and combinations thereof, and
a second microlayer of a flexible polymer having a melting temperature ranging between about 50° C. and about 120° C. attached to the first microlayer, the flexible polymer being selected from the group consisting of elastomeric polypropylenes, low density polyethylenes, ultra low density polyethylenes, substantially linear polyethylenes, ethylene methyl acrylate copolymers, ethylene acrylic acid copolymers, and combinations thereof, each of the first microlayer and the second microlayer having a thickness ranging between about 0.01 microns and about 10 microns.

2. An autoclavable film comprising:
a skin layer comprising a material selected from the group consisting of random copolymer polypropylenes, polypropylene homopolymers, nylons, styrene-ethylene-butylene-styrene block copolymers, copolyester ethers, and combinations thereof;
a core layer comprising a first microlayer of a heat resistant polymer and a second microlayer of a flexible polymer having a melting temperature ranging between about 50° C. and about 120° C. attached to the first microlayer, the flexible polymer being selected from the group consisting of elastomeric polypropylenes, low density polyethylenes, ultra low density polyethylenes, substantially linear polyethylenes, ethylene methyl acrylate copolymers, ethylene acrylic acid copolymers, and combinations thereof, each of the first microlayer and the second microlayer having a thickness ranging between about 0.01 microns and about 10 microns; and
a seal layer.

3. An autoclavable film comprising:
a skin layer;
a core layer comprising a first microlayer of a heat resistant polymer and a second microlayer of a flexible polymer having a melting temperature ranging between about 50° C. and about 120° C. attached to the first microlayer, the flexible polymer being selected from the group consisting of elastomeric polypropylenes, low density polyethylenes, ultra low density polyethylenes, substantially linear polyethylenes, ethylene methyl acrylate copolymers, ethylene acrylic acid copolymers, and combinations thereof, each of the first microlayer and the second microlayer having a thickness ranging between about 0.01 microns and about 10 microns; and
a seal layer comprising a material selected from the group consisting of polypropylene random copolymers, polypropylene homopolymers, nylons, styrene-ethylene-butylene-styrene block copolymers, copolyester ethers, and combinations thereof.

4. An autoclavable film comprising:
a skin layer;
a core layer comprising a first microlayer of a heat resistant polymer selected from the group consisting of polypropylene homopolymers, polypropylene random copolymers, cyclic olefin copolymers, and combinations thereof, and a second microlayer of a flexible polymer having a melting temperature ranging between about 50° C. and about 120° C. attached to the first microlayer, the flexible polymer being selected from the group consisting of elastomeric polypropylenes, low density polyethylenes, ultra low density polyethylenes, substantially linear polyethylenes, ethylene methyl acrylate copolymers, ethylene acrylic acid copolymers, and combinations thereof, each of the first microlayer and the second microlayer having a thickness ranging between about 0.01 microns and about 10 microns; and
a seal layer.

* * * * *